Mar. 6, 1923.
G. L. KELLEY
1,447,725
MEANS FOR CONNECTING THE PARTS OF STRUCTURES
Filed July 22, 1920
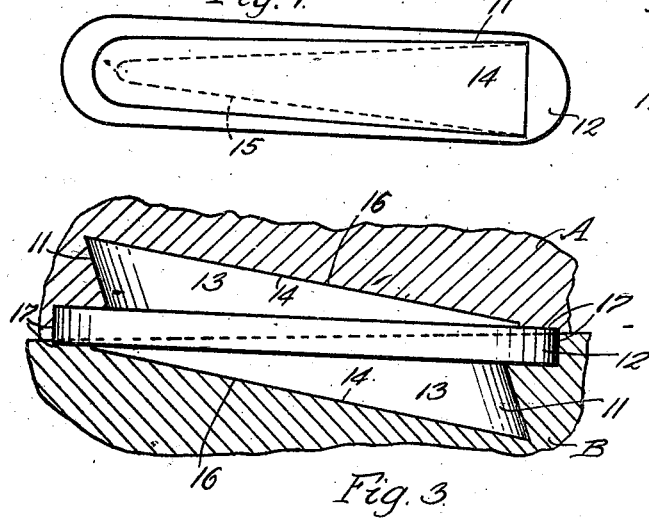
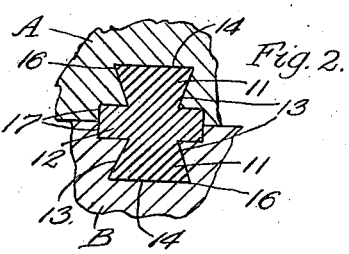
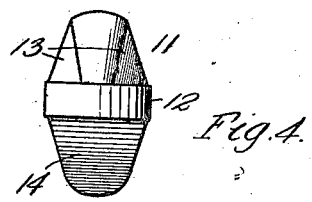
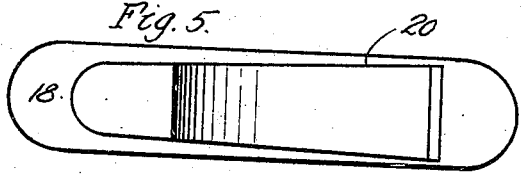
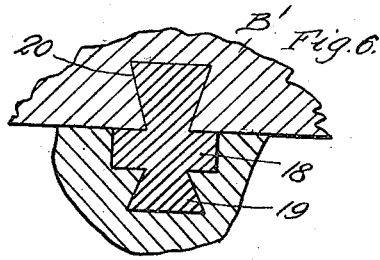
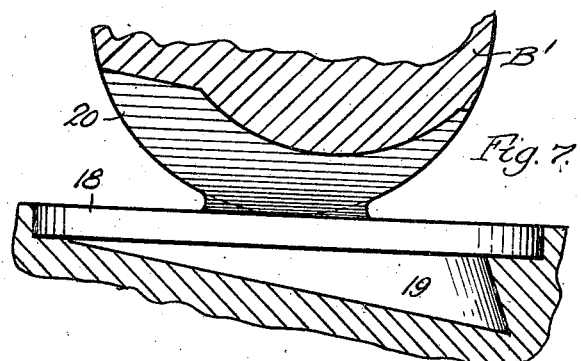
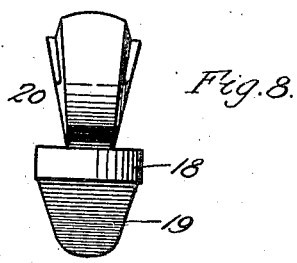
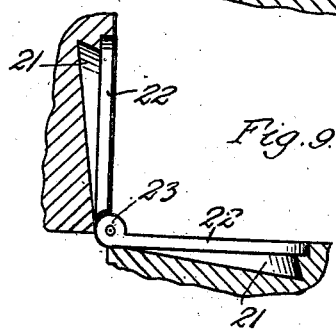
Inventor.
George L. Kelley
By Parker & Boehmer
Attorneys.

Patented Mar. 6, 1923.

1,447,725

UNITED STATES PATENT OFFICE.

GEORGE L. KELLEY, OF BUFFALO, NEW YORK.

MEANS FOR CONNECTING THE PARTS OF STRUCTURES.

Application filed July 22, 1920. Serial No. 398,278.

*To all whom it may concern:*

Be it known that I, GEORGE L. KELLEY, a citizen of the United States, residing at Buffalo, in the county of Erie and State of New York, have invented a new and useful Improvement in Means for Connecting the Parts of Structures, of which the following is a specification.

This invention relates to connecting devices or quoins for use between the members or parts of structures, for the purpose of drawing together said members and securely and rigidly locking or tying them in place, or in cases where it is desired to connect the members so as to permit a given movement or adjustment thereof, for the purpose of holding them securely in the intended relation.

The objects of the invention are to produce a connecting device of this nature which is strong and adapted to produce a strong, rigid connection between the members or parts to be connected, and which is constructed so that it is adapted to wedge in a plurality of directions in the seats or recesses therefor in the members or parts to be connected, so that the connecting device can be forced tightly into position and will be held firmly from movement in the recess in each of the members and will at the same time tend to draw the members together; also to produce a connecting device of the character stated, which is provided with oppositely disposed, dovetail tongues adapted to seat in correspondingly shaped recesses in the two members or parts to be connected, and which is provided at the bases or connected edges of the tongues with an enlarged strengthening portion which is adapted to occupy complementary recesses in the members or parts so as to relieve the tongue from strain incident to lateral stresses on the members or parts; also to improve the construction of connecting devices or quoins of the character stated, which are adapted for a variety of uses and for connecting parts of members of various sorts, either in rigid or movable relation to each other.

In the accompanying drawings:

Fig. 1 is a plan view of a connecting device embodying the invention.

Fig. 2 is a cross section thereof showing the same in place in the members connected thereby.

Fig. 3 is a view showing the connecting device in side elevation in place in the members connected thereby.

Fig. 4 is an end elevation of the connecting device detached.

Fig. 5 is a plan view of a connecting device of modified form adapted for connecting a curved and a flat faced member.

Fig. 6 is a cross section of the same showing the device in place in the parts connected thereby.

Fig. 7 is a side elevation thereof, showing the device in place in the members connected thereby.

Fig. 8 is an end elevation thereof.

Fig. 9 is a sectional elevation showing another modification in which the connecting device is composed of hinged sections for connecting two members or parts together at different angles, or so as to permit a hinging movement thereof.

Referrings to Figs. 1–4, the quoin or connecting device comprises two oppositely arranged tongues 11, 11, and an intermediate, enlarged or plate-like portion 12 which extends lengthwise between the two tongues and from opposite sides of which the tongues project. Each of the tongues, as shown in Fig. 2, is of dovetail shape in cross section, or has opposite side faces 13 which incline towards each other from the outer face 14 of the tongue toward the base of the tongue at the enlarged intermediate portion 12 of the device. The tongue is also of wedge-shape lengthwise, or is deepest at one end and gradually decreases in depth or thickness from this end toward the opposite end thereof and is preferably of obtuse angle triangular outline in longitudinal vertical section and arranged with the shorter side of the triangle adjoining the intermediate portion 12. The outer, inclined face 14 of the tongue, as shown in Fig. 1, is also preferably widest at the thin end of the tongue and tapers toward the thick end so that the side faces 13 of the tongue converge lengthwise toward the deep or thick end of the tongue as well as converging transversely toward the intermediate portion 12 of the device. These side faces 13 of the tongue meet the enlarged intermediate portion 12 on lines shown at 15, Fig. 1, which diverge from the narrow, thick end of the tongue substantially to the full width of the tongue at its thin end. The tongues 11 are adapted to fit in correspondingly shaped recesses 16 in the members or parts A and B to be connected and owing to the described dovetail and wedge shape of the tongue, the tongue is adapted to wedge in the recess both lengthwise and crosswise of the tongue so that when the tongue is forced endwise into the recess the tongue is drawn inwardly and also wedged tightly in the recess. Therefore, when forcing the two members or parts A and B into position on the opposite tongues said parts are drawn towards each other into close, firm contact and at the same time the connecting device is wedged lengthwise and crosswise firmly into place in the seats in the members or parts A and B.

The quoin or connecting device can be made of metal, wood or any other suitable material, depending upon the use to which it is to be put and the nature of the members or parts to be connected. When the device is used for connecting wooden or other members or parts capable of being shaped by cutting, the recesses in the members for the tongues can be readily cut by means of a rotary, dovetailed cutter of substantially the cross sectional shape of the deep end of the tongue, which cutter is caused to enter the wood at an inclination corresponding to the inclination of the outer face 14 of the tongue. Where the device is used for connecting members or parts made from plastic material, the recesses for the tongues can be readily formed to fit the tongues by molding.

In addition to the recesses 16 for the tongues, the members or parts A and B are also provided with complementary recesses indicated at 17 to receive the enlarged intermediate portion 12 of the connecting device. The bottoms of these recesses also preferably incline lengthwise relatively to the planes of the meeting faces of the members or parts A and B, so that when the quoin or connecting device is in place between the parts, its enlarged, intermediate portion extends at an angle across the joint between the members or parts. These recesses can also be cut by an appropriately shaped rotary tool which is caused to enter the material at an inclination corresponding to the inclination of the faces of the enlarged intermediate portion of the device. Since the recesses 17 for the enlarged intermediate portion of the device, as well as the recesses 16 for the tongues extend at an inclination into the member or part A or B, as the case may be, a firm seat or contact of the face of the enlarged intermediate portion with the bottom of the seat 17 will be caused when the tongue is forced into place in its seat.

In the modification shown in Figs. 5-8, the device is provided with an enlarged or plate-like, intermediate portion 18 and with a tongue 19 on one side thereof which is shaped like the tongues 11, already described. At the opposite side of the intermediate portion 18, the device is provided with a tongue 20 which is analogous in shape lengthwise and crosswise with the tongues already described but is formed on a curve so as to adapt this tongue to fit in a correspondingly shaped curved recess in a member or part B' having a curved or circular outer face. The tongue 20 is adapted to enter this curved recess and wedge in the same, as in the case of the straight tongue, but the tongue is moved in a curved line into place in its recess.

The quoin or connecting device shown in Fig. 9 is provided with tongues 21 formed like the tongues first described but these tongues project from two enlarged or plate-like portions 22, which are hinged together at one end as 23 by a hinge joint of any suitable construction so that the two sections of the device can be adjusted to different angles to each other for the purpose of connecting members or parts at such angles, or for the purpose of connecting two parts or members so that they can swing relatively to each other as when connected by a hinge.

Connecting devices of the nature described are adapted by changes in the form, position or relation of their parts, which will be obvious to those skilled in the use of such devices, for connecting a great variety of parts or members for many different purposes which it is considered unnecessary to enumerate herein, the nature of the invention and its possible uses being sufficiently indicated by the different forms and applications of the same hereinbefore described.

I claim as my invention:

1. The combination with a pair of members to be secured together, of a connecting device comprising oppositely arranged tongues, and an enlarged intermediate portion connecting said tongues, each of said tongues being of dove tail shape in cross section and gradually increasing in depth lengthwise from one end to the other, said members having recesses in their adjoining faces, each of said recesses being deeper at one end than at the other end and shaped to fit one of said tongues and to enclose said tongue at one side and at least one end, and complementary recesses in said members to receive said enlarged intermediate portion of said connecting device.

2. A connecting device for securing members together, comprising oppositely arranged tongues and an enlarged intermediate portion connecting said tongues, each of said tongues being of dove tail shape in cross section, said tongues gradually increasing in depth lengthwise in opposite directions and being adapted to fit into correspondingly shaped recesses in said members, said intermediate portion being of greater length and width than said tongues and adapted to fit in complementary recesses in said members and cross the joint between the members.

3. A connecting device for securing members together, comprising oppositely arranged rigidly connected tongues each of which is of dove tail shape in cross section and of obtuse angle triangular outline in longitudinal vertical section and is adapted to fit into a correspondingly shaped recess in one of said members.

4. A connecting device for securing members together, comprising oppositely arranged tongues and an enlarged intermediate portion connecting said tongues, at least one of said tongues being of dove tail shape in cross section and of obtuse angle triangular outline in longitudinal vertical section and being adapted to fit into a correspondingly shaped recess in one of said members, and said intermediate portion being of greater length and width than said tongues and adapted to fit in complementary recesses in said members and cross the joint between the members.

5. The combination with members to be secured together, of a device having oppositely arranged tongues and an enlarged intermediate portion connecting said tongues, at least one of said tongues being of dove tail shape in cross section and of obtuse angle triangular outline in longitudinal vertical section with the shorter side of said triangle adjoining said intermediate portion, of a recess in one of said members shaped to receive said dove tail tongue, said recess being deeper at one end than at its other end, and complementary recesses in said members and across the joint between the members to receive said enlarged intermediate portion.

6. A connecting device for securing members together, comprising oppositely arranged rigidly connected tongues at least one of which is of obtuse angle triangular outline in longitudinal vertical section and is adapted to fit into a correspondingly shaped recess in one of said members.

Witness my hand this 15th day of July, 1920.

GEORGE L. KELLEY.

Witnesses:
CHARLES B. CONRAD,
LIZZIE A. CONRAD.